United States Patent
Harasse

(10) Patent No.: US 10,705,513 B2
(45) Date of Patent: Jul. 7, 2020

(54) COMPUTER-ASSISTED METHODS OF QUALITY CONTROL AND CORRESPONDING QUALITY CONTROL SYSTEMS

(71) Applicant: Airbus Operations (S.A.S.), Toulouse (FR)

(72) Inventor: Olivier Harasse, Tournefeuille (FR)

(73) Assignee: Airbus Operations (S.A.S.), Toulouse (FR)

( * ) Notice: Subject to any disclaimer, the term of this patent is extended or adjusted under 35 U.S.C. 154(b) by 641 days.

(21) Appl. No.: 14/742,128

(22) Filed: Jun. 17, 2015

(65) Prior Publication Data

US 2015/0367961 A1    Dec. 24, 2015

(30) Foreign Application Priority Data

Jun. 18, 2014   (FR) ................................. 14 55605

(51) Int. Cl.
| | | |
|---|---|---|
| G06F 17/00 | (2019.01) | |
| G06N 5/02 | (2006.01) | |
| G05B 19/418 | (2006.01) | |
| G06Q 10/06 | (2012.01) | |
| B64F 5/10 | (2017.01) | |

(52) U.S. Cl.
CPC .......... *G05B 19/41875* (2013.01); *B64F 5/10* (2017.01); *G06Q 10/06395* (2013.01); *G05B 2219/32368* (2013.01)

(58) Field of Classification Search
CPC .... B64F 5/0009; B64F 5/10; G05B 19/41875; G05B 2219/32368; G06Q 10/06395
See application file for complete search history.

(56) References Cited

U.S. PATENT DOCUMENTS

| | | | | |
|---|---|---|---|---|
| 7,349,889 | B1 * | 3/2008 | Alling | G06F 11/2257 706/45 |
| 2004/0138556 | A1 * | 7/2004 | Cosman | G06T 3/00 600/424 |
| 2005/0060662 | A1 * | 3/2005 | Soares | G06Q 10/06 715/810 |
| 2008/0307327 | A1 * | 12/2008 | Newcomer | G06T 19/20 715/757 |

(Continued)

FOREIGN PATENT DOCUMENTS

| | | |
|---|---|---|
| EP | 2 172 888 A1 | 4/2010 |
| EP | 2 562 696 A1 | 2/2013 |
| WO | WO 2013/091131 A1 | 6/2013 |

OTHER PUBLICATIONS

French Search Report for Application No. 14 55605 dated Feb. 6, 2015.

*Primary Examiner* — Luis A Sitiriche
(74) *Attorney, Agent, or Firm* — Jenkins, Wilson, Taylor & Hunt, P.A.

(57) ABSTRACT

The disclosure herein relates to a quality control method and system in aeronautical manufacturing. The system comprises a tablet connected to a concession management server, the server being itself linked to an aircraft configuration database, a three-dimensional digital model of the aircraft and a fault database. The element to be inspected is identified using the digital model and the fault is characterized by browsing a predetermined decision tree associated with the element.

10 Claims, 5 Drawing Sheets

(56) References Cited

U.S. PATENT DOCUMENTS

| | | | |
|---|---|---|---|
| 2010/0162029 A1* | 6/2010 | Powell | G06Q 10/06 |
| | | | 714/2 |
| 2010/0318396 A1* | 12/2010 | Geddam | G06N 5/022 |
| | | | 706/12 |
| 2012/0078410 A1 | 3/2012 | Wong et al. | |
| 2014/0052645 A1* | 2/2014 | Hawes | G06Q 10/20 |
| | | | 705/304 |
| 2014/0135062 A1* | 5/2014 | Bevirt | F16M 11/041 |
| | | | 455/556.1 |

* cited by examiner

COMPUTER-ASSISTED METHODS OF QUALITY CONTROL AND CORRESPONDING QUALITY CONTROL SYSTEMS

CROSS-REFERENCE TO RELATED APPLICATION

This application claims priority to FR 14 55605 filed Jun. 18, 2014, the entire disclosure of which is incorporated by reference herein.

TECHNICAL FIELD

The present disclosure relates generally to the field of quality control and, more particularly, to that of the automated management of concessions in the field of aeronautical construction.

BACKGROUND

Quality control is an essential operation in aeronautical construction. It makes it possible to check that each element of an aircraft does indeed conform to the technical specifications stipulated by the constructor. In effect the certification of the aircraft depends on the observance of this conformity. The technical specifications can be, depending on the nature of the element, geometrical dimensions with certain tolerances, mechanical or electrical characteristics for example.

Quality control is applied at each step of integration, particularly in the final assembly line (FAL) phase of the aircraft.

FIG. 1 schematically represents steps of a quality control known from the prior art.

The quality control begins with a declaration of an agent. The latter verifies the conformity of the inspected element with the technical specifications stipulated by the constructor and declares, at 110, the nonconformity in the event of disparity. The declaration can comprise measurements, photographs, and a description of any disparities observed. These observations are entered into a report, called concession declaration, or COD. The report contains the identifier of the element concerned, its serial number and the declaration of nonconformity.

The report is then transmitted to the designer, approved by the certification authority, which performs an analysis step, 120, followed by a validation step, 130. The step 120 consists in analysing the consequences resulting from the nonconformity of the element, particularly on the other elements interacting therewith, and, if appropriate, in proposing measures to remedy these consequences.

At this stage, the conclusions of the designer can be as follows:
- the element is acceptable despite its nonconformity with the technical specifications;
- the element is unacceptable and is therefore scrapped;
- the element is acceptable subject to a repair being performed.

These conclusions are entered into a document of response to the concession request, called COA (Concession Answer). When the repair is performed, the repaired element returns once again to the designer for a second analysis step. If the element is considered acceptable, despite its initial nonconformity or because the repair is satisfactory, the designer validates the solution retained for it to undergo a test phase.

The test phase also comprises an analysis step, 140, and a validation step, 150, performed by a tester approved by the certification authority. In the analysis phase, the tester applies a test making it possible to check whether the nonconforming or repaired element meets the requisite safety requirements. In the validation phase, the tester confirms or rejects the acceptability of the element, and enters the result of the test in a test report or COS (Concession Stress).

Finally, in the step 160, the above-mentioned reports are signed by a quality control agent who checks that the procedure has been followed correctly.

The quality control procedure as a whole is particularly complex because of the large number of round trips that it can involve between the different agents. In effect, the reports can be drawn up relatively freely so they are often the source of omissions or of divergent interpretations between the agents. For this reason, each agent in practice checks the operations performed in the preceding steps. Furthermore, each omission or proven error entails returning to the step called into question and once again performing all the subsequent steps.

Finally, since the quality control takes place at different stages of construction of the aircraft and at different assembly levels, its complexity is a critical issue in terms of construction costs and delivery time.

The problem on which the disclosure herein is based is consequently to propose a quality control method for the elements of an aircraft which is widely automated, fast and efficient. Another aim of the present disclosure is to propose a quality control system that makes it possible to implement the abovementioned method.

SUMMARY

The present disclosure is defined by a quality control system for the construction of an aircraft comprising a plurality of elements, the system comprising a human-machine interface connected to a concession management server, a concession being requested in the case of nonconformity of an element of the plurality to a set of predetermined technical specifications, the server being itself linked to a first aircraft configuration database describing the elements of the aircraft according to a tree structure, a second fault database containing a catalogue of fault types for the different elements of the aircraft, and a third database containing a three-dimensional digital model of the aircraft.

The human-machine interface is advantageously a digital tablet equipped with position and attitude sensors.

Preferably, each type of fault in the second database has an associated predetermined decision tree.

The server can then be adapted to search a decision tree in the second database from an identifier of the element and to browse, by an inference engine, the decision tree.

Furthermore, the server is advantageously adapted to search in the third database for a three-dimensional representation of an element of the aircraft from an identifier of this element, and display the representation on the human-machine interface.

The three-dimensional representation can be overlaid on a real image of the element taken by the human-machine interface, so as to facilitate its identification.

The disclosure herein relates also to a computer-assisted quality control method for the construction of an aircraft comprising a plurality of elements, the method comprising:

detecting or detection of a nonconformity of an element of the aircraft with a set of predetermined technical specifications;

identifying or identification of the element using a three-dimensional digital model of the aircraft; and browsing of a decision tree associated with the duly identified element.

The step of identification of the element of the aircraft advantageously comprises selecting or selection of a representation of this element in the digital model.

The position of the nonconformity or fault can be entered into the digital model by selecting a part of the representation of the element of the aircraft.

The method can comprise the transmission to the computer of a declaration of nonconformity of the element of the aircraft.

The method can further comprise a step of validation of the declaration of nonconformity after the decision tree has been browsed.

A modification of the appearance of the element can advantageously be provided in the digital model when the declaration of nonconformity has been validated.

BRIEF DESCRIPTION OF THE DRAWINGS

Other features and advantages of the disclosure herein will become apparent on reading preferred embodiments of the disclosure herein, with reference to the attached figures in which.

DETAILED DESCRIPTION

A quality control method for an aircraft construction and assembly line will be considered hereinbelow. The quality control method comprises a plurality of steps as described in the introductory part. The idea on which the disclosure herein is based is to simplify and standardize the quality control steps, notably that of declaration of nonconformity (or concession request according to the current terminology), and do so through the use of a quality control system described hereinbelow.

Figure 2:
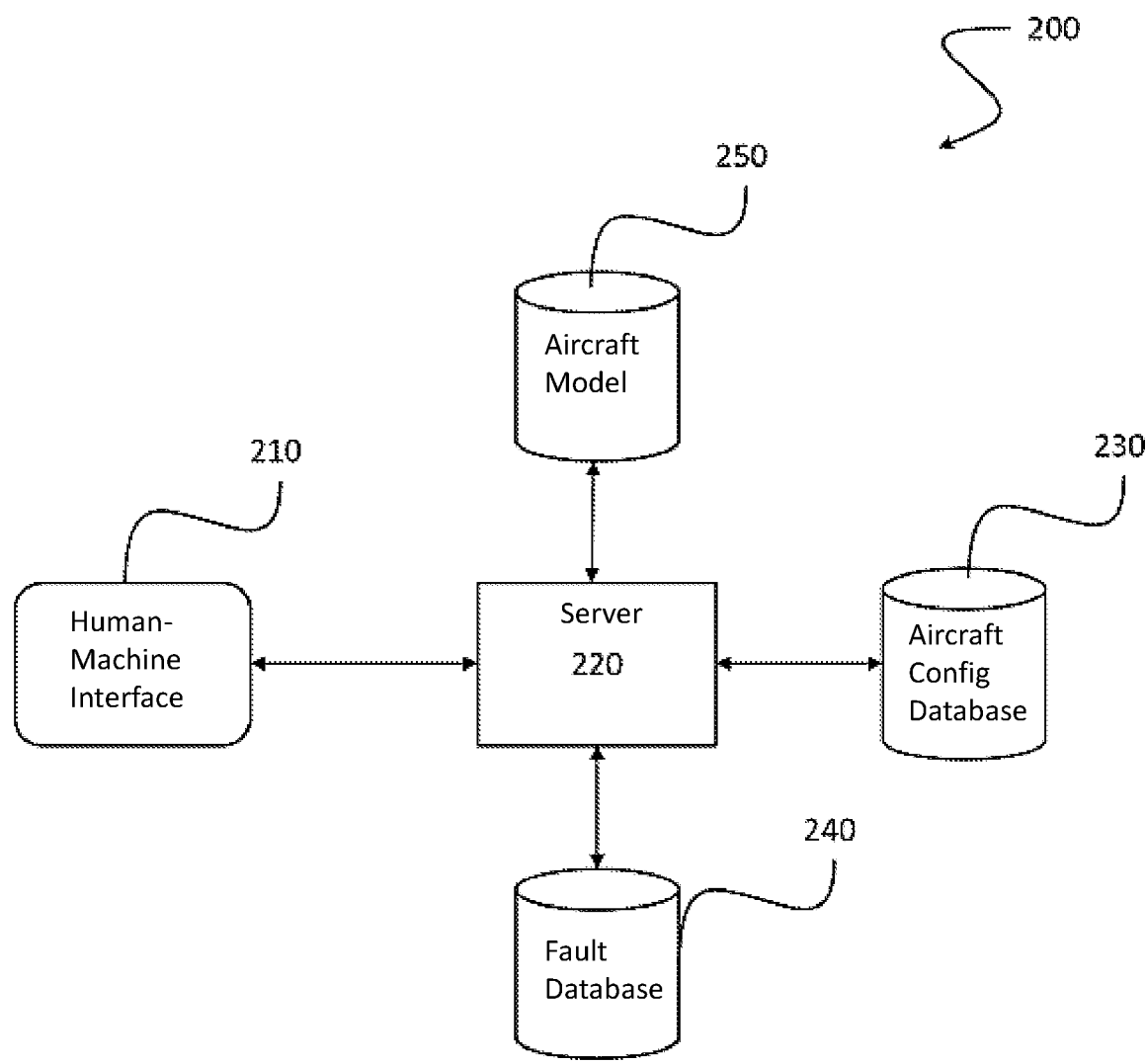
FIG. 2 schematically represents a quality control system according to an embodiment of the disclosure herein.

FIG. 2 represents a quality control system according to an embodiment of the disclosure herein.

This system, 200, comprises a human-machine interface, 210, for example a tablet equipped with a camera. This interface is linked by a wireless link (Wi-Fi, 3G, etc.) to a network to which there are connected a server, called concession management server, 220, an aircraft configuration database, 230, a fault database, 240, and a database containing a digital model of the aircraft, 250. Advantageously, the human-machine interface will be able to be equipped with position and attitude sensors making it possible to determine the position and the attitude of the tablet in the aircraft.

The agents responsible for the quality control can interrogate the server 220 in the form of requests and transmit information to it via the human-machine interface 210.

The configuration database 230 describes the elements of the aircraft according to a tree structure whose root is the aircraft itself (level 0 of the tree). Each node of the tree has an associated element of the aircraft and an identifier of this element. Each element of a level n can be broken down into a plurality of elements of level n+1. A complete description of all the elements of the aircraft is thus obtained, the leaves of the tree representing the simplest elements.

Figure 3:
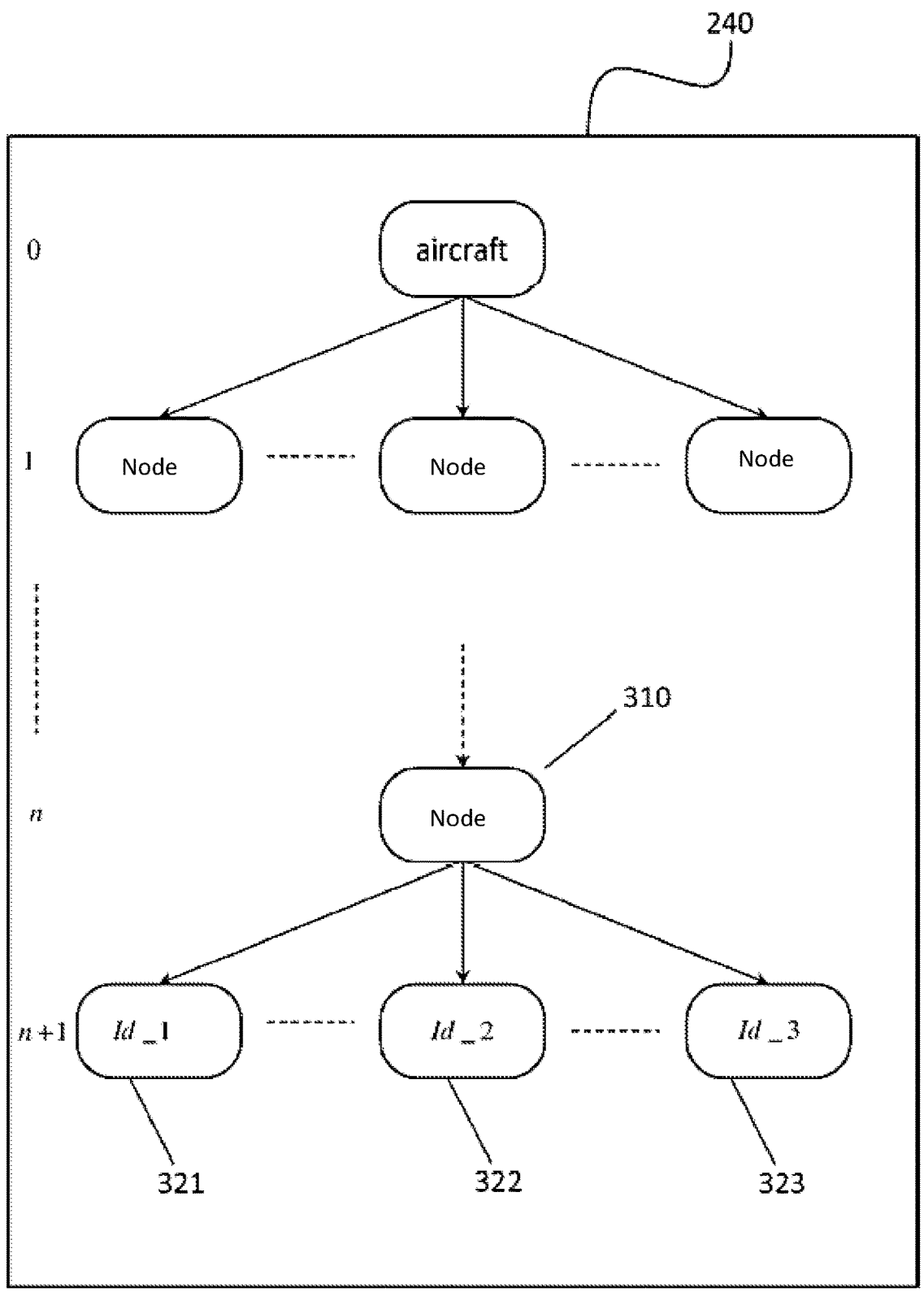
FIG. 3 schematically represents the structure of the aircraft configuration database, used in the system of FIG. 2.

FIG. 3 schematically represents the structure of the aircraft configuration database.

The element 310 of level n is broken down in the example illustrated into three elements, 321, 322, 323, of level n+1. Each of these elements has an associated identifier, i.e. Id_1, Id_2, Id_3. Each identifier identifies an element in a one-to-one manner in the aircraft.

For example, the element 321 can correspond to a metal beam and the elements 322 and 323 to fixing brackets.

Each element in the configuration database points to a list of possible fault types in the fault database 240. This list of fault types can be pre-entered according to the experience already acquired in the use of this element, and complemented as new faults are itemized. Each element also has an associated decision tree whose leaves correspond to the fault types in the list relating to this element. The decision tree is advantageously browsed using an inference engine.

Also, each element of the configuration database can be viewed by the digital model of the aircraft. More specifically, this digital model contains a three-dimensional representation of the aircraft with all its constituent elements. An agent responsible for quality control can navigate within the digital model and identify any element of the aircraft by pointing and clicking on its representation in the model. Conversely, from an identifier of an element in the configuration database, the operator can be guided within the digital model to the position of this element. The latter is identified in the model using a particular color or a highlight for example.

The concession management server, 220, enables each quality control operator (declarer, designer, tester) to know precisely where he or she is located in the procedure and what action he or she has to perform. Furthermore, each operator is guided by the server throughout his or her task. More specifically, he or she may be required to complete an electronic form and be guided along a decision tree using a set of questions/answers. It is only when all of the fields of the form and/or the decision tree have been considered to have been covered that the operator can go on to the next step. The risk of error, omission or incorrect interpretation of the instructions is thus considerably minimized. Furthermore, certain form fields and/or certain nodes of the decision tree will be able to be provided with contextual aid to facilitate the task of the agent.

Figure 4:
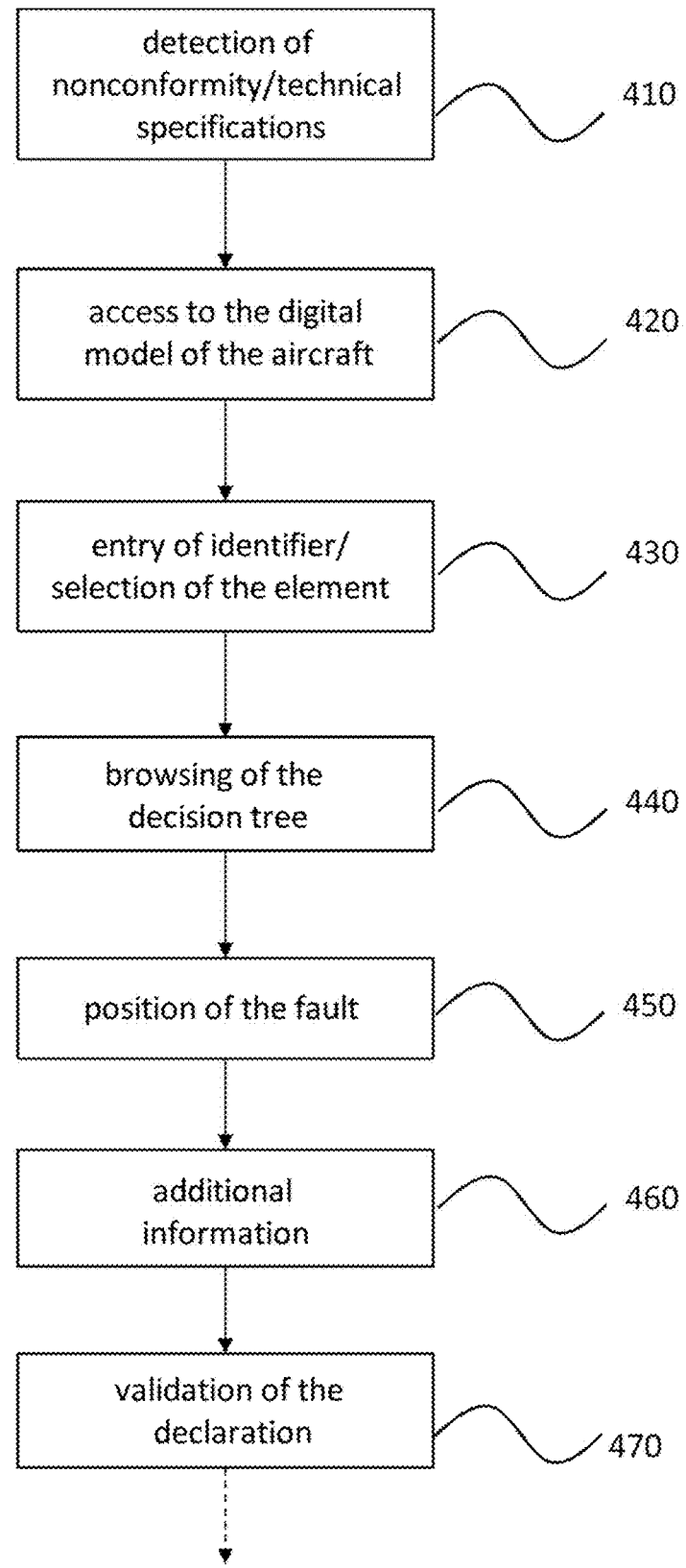
FIG. 4 represents a flow diagram of a quality control method according to an embodiment of the disclosure herein.

FIG. 4 represents a flow diagram of a quality control method according to an embodiment of the disclosure herein.

More specifically, this figure illustrates an example of declaration of nonconformity by the system of FIG. 2.

In the step 410, the agent detects a nonconformity of an element of the aircraft with respect to the stipulated technical specifications.

In the step 420, the operator accesses the digital model of the aircraft via the concession management server. For this, the operator supplies the server with the type and, if appropriate, the serial number of the aircraft concerned.

In the step 430, the operator enters the identifier of the inspected element or PN (Part Number).

Alternatively, the operator can simply take an image of the inspected element by his or her tablet. From the information from the position and attitude sensors of the tablet, the operator is offered a certain number of elements in the digital model and can select the inspected element. In a particular exemplary embodiment, the proposed element can be overlaid on the real image taken by the tablet, according to an augmented reality principle.

Conversely, if the operator has directly entered the identifier of the element, he or she can be directed automatically to the part of the digital model relating to the environment thereof. It is then possible for him or her to confirm the inspection of the element concerned by selecting its representation in the digital model. The server then retrieves the corresponding identifier of the element from the digital model and from the configuration database.

In any case, from the identifier of the element to be inspected, the server 220 browses, in 440, the decision tree associated with this element in the fault database 240. At each node of the decision tree, the server can transmit questions to the agent. The latter completes the corresponding answer fields by the human-machine interface 210 which transmits the answer to the server.

For example, the agent may be prompted to indicate whether the nonconformity relates to a part of the element concerned (in which case he or she can be directed to a sub-element of level n+1 in the configuration tree) or, on the contrary, relates to a higher element of level n+1 in this tree. The nonconformity may then relate to the manner in which the element has been mounted or assembled.

He or she can then be prompted to specify the type of fault to be declared. For example, in the case of a fault to be declared for a mechanical part, the fault type will be able to be selected from a set of itemized faults such as: scaling of a hole of the part, delamination of a hole of the part, impact on the part, delamination of an edge of the part, tool mark on the part, etc. The faults listed depend generally on the structure and the material of the mechanical part concerned.

Once the fault type has been entered, the server can prompt the agent to indicate, at 450, by the digital model, where the fault is located on the nonconforming element. For example, if the element has a number of parts or a number of faces, it will be possible to select, on the representation of the element, the part or the face with the fault.

Depending on the element and the fault type, the server can ask the agent who sends it additional information in 460. For example, if it is an impact on a mechanical part, the server can ask for the position of the impact, its size and its depth to be measured. If appropriate, the agent will also be able to attach a photograph of the fault taken using his or her tablet.

Figure 5:
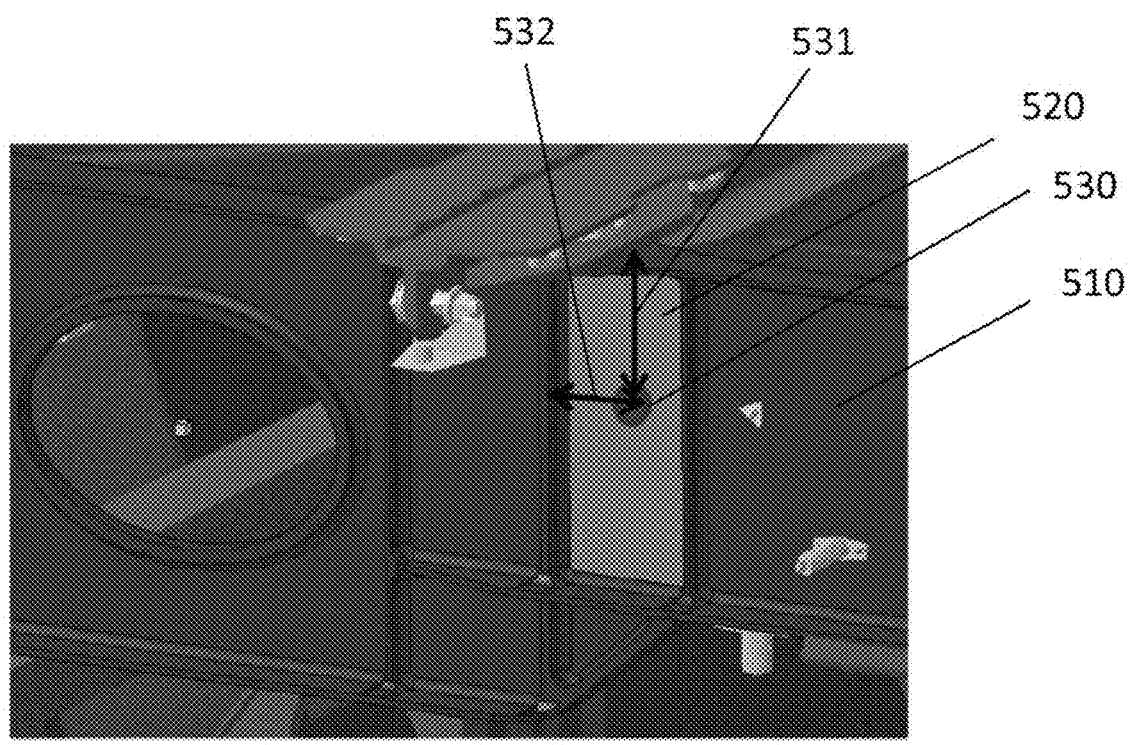
FIG. 5 illustrates an exemplary fault declaration by the method of FIG. 4.

FIG. 5 represents an exemplary declaration of fault of an element by the digital model. The defective element is, here, a beam, 510, and the fault is an impact of an area of this beam. The agent has indicated, in 520, the zone of the beam affected and has entered the distances 531, 533 from the fault to the edges of this area.

It will be understood that having the agent guided by the requests from the server according to a decision tree considerably reduces the risk of error, omission or of incorrect interpretation of the quality control instructions.

When the server determines that the decision tree has been entirely browsed and that all the requisite information has been supplied, it allows the agent to validate his or her declaration in 470.

Once the declaration has been validated by the agent, the server advantageously modifies the representation of the inspected element in the digital model. Generally, the appearance of the element can be modified according to its status, for example: element not yet inspected, element declared valid, element declared nonconforming, element to be scrapped.

Figure 1:
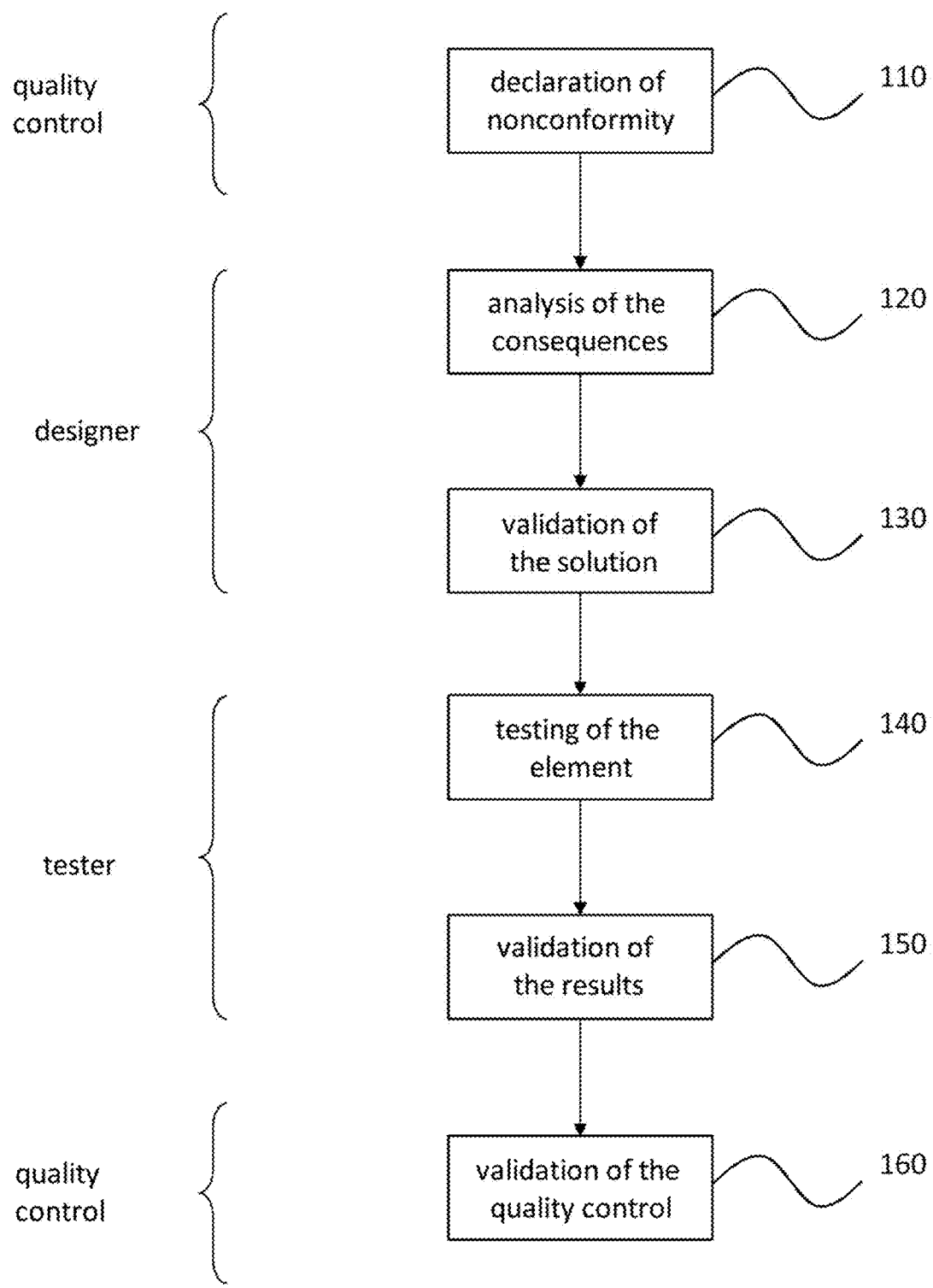
FIG. 1 schematically represents a quality control method known from the prior art.

After the declaration of nonconformity has been validated in 470, the designer can perform an analysis step and a validation step as described in relation to FIG. 1. After validation by the designer, the server once again modifies the status of the element. The latter is then subjected to an analysis and validation step in a test phase.

At the end of the quality control procedure, that is to say after the inspection steps by the designer and the tester have been carried out, the element is declared valid or to be scrapped. Thus, it is possible to view, very rapidly, in any area of the aircraft, the elements which remain to be inspected, those which are in the inspection phase, those which are to be scrapped, etc. Since the updating of the statuses in the digital model is always supervised by the server, the risk of inconsistency or of error is almost nonexistent.

Finally, the designer and the tester receive a declaration of nonconformity which has been drawn up in a standardized and supervised manner. They do not therefore have to check the correct execution of the declaration instructions. The result thereof is a simpler, more rapid and more effective quality control than that of the prior art.

The subject matter described in this disclosre may be implemented in hardware, software, firmware, or any combination thereof. As such, the terms "function", "node" or "module" as used herein refer to hardware, software and/or firmware components for implementing the feature(s) being described. In some examples, the subject matter described in this specification may be implemented using a non-transitory computer readable medium storing computer executable instructions that when executed by the processor of a computer cause the computer to perform steps.

Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A quality control system for construction of an aircraft, the aircraft comprising a plurality of elements, and the quality control system comprising:
a concession management server comprising at least a first processor; and
a user device comprising at least a second processor and a display and a user input device, wherein the user device is connected to the concession management server, and wherein the user device is configured to send to the concession management server a request message for a concession in response to receiving user input from a quality control operator indicating nonconformity of an element of the plurality of elements to a set of predetermined technical specifications,
wherein the concession management server is linked to a first aircraft configuration database describing the plurality of elements of the aircraft according to a tree structure, a second fault database containing a catalogue of fault types for the plurality of elements of the aircraft, and a third database containing a three-dimensional digital model of the aircraft, and
wherein the concession management server is configured to, in response to receiving the request message for the concession, determine a fault type for the element by guiding the quality control operator to identify the fault type, including sending, to the user device for presentation to the quality control operator on the display of the user device, a series of requests and receiving, from the user device, a responsive answer to each request in the series of requests, such that each successive request in the series of requests is based on browsing, using the responsive answer to a previous request, a decision tree associated with the element in the fault database, and
wherein the user device comprises a digital tablet equipped with position and attitude sensors, and wherein the user device is configured to present, on the display, a certain number of elements in the three-dimensional digital model of the aircraft based on sensor information received from the position and attitude sensors by determining a location of the user device with respect to the aircraft and selecting the certain number of elements based on the location of the user device with respect to the aircraft, and wherein receiving user input from the quality control operator indicating nonconformity of the element comprises receiving a selection from the quality control operator of the element from the certain number of elements in the three-dimensional digital model of the aircraft to indicate the nonconformity of the element.

2. The quality control system according to claim 1, wherein decision tree comprises a plurality of leaves each corresponding to a possible fault type for the component.

3. The quality control system according to claim 2, wherein the concession management server is configured to browse, by an inference engine, the decision tree.

4. The quality control system according to claim 1, wherein the concession management server is adapted to search in the third database for a three-dimensional representation of an element of the aircraft from an identifier of this element, and display the representation on the display of the user device.

5. The quality control system according to claim 4, wherein the three-dimensional representation is overlaid on a real image of the element taken by the user device.

6. A computer-assisted quality control method for construction of an aircraft, the aircraft comprising a plurality of elements, the method comprising:
receiving, by a concession management server comprising at least a first processor, a request message for a concession from a user device comprising at least a second processor;
determining, by the concession management server, that the request message indicates nonconformity of an element of the plurality of elements to a set of predetermined technical specifications as determined by user input from a quality control operator; and
in response to receiving the request message for the concession, determining, by the concession management server, a fault type for the element by guiding the quality control operator to identify the fault type, including sending, to the user device for presentation to the quality control operator on the display of the user device, a series of requests and receiving, from the user device, a responsive answer to each request in the series of requests, such that each successive request in the series of requests is based on browsing, using the responsive answer to a previous request, a decision tree associated with the element in a fault database containing a catalogue of fault types for the plurality of elements of the aircraft,
wherein the user device comprises a digital tablet equipped with position and attitude sensors, and wherein the user device is configured to present, on the display, a certain number of elements in the three-dimensional digital model of the aircraft based on sensor information received from the position and attitude sensors by determining a location of the user device with respect to the aircraft and selecting the certain number of elements based on the location of the user device with respect to the aircraft, and wherein receiving user input from the quality control operator indicating nonconformity of the element comprises receiving a selection from the quality control operator of the element from the certain number of elements in the three-dimensional digital model of the aircraft to indicate the nonconformity of the element.

7. The quality control method according to claim 6, comprising entering a position of the non-conformity into the three-dimensional model of the aircraft by receiving, from the user device, a selection by the quality control operator of a part of the representation of the element of the aircraft.

8. The quality control method according to claim 6, comprising receiving, from the user device, a declaration of nonconformity of the element of the aircraft.

9. The quality control method according to claim 8, further comprising validating the declaration of nonconformity after the decision tree has been browsed.

10. The quality control method according to claim 9, comprising modifying the appearance of the element in the three-dimensional model of the aircraft when the declaration of nonconformity has been validated.

* * * * *